United States Patent [19]

Nicolet

[11] Patent Number: 5,671,414
[45] Date of Patent: Sep. 23, 1997

[54] METHOD AND APPARATUS FOR PROVIDING SIMPLE SECURE MANAGEMENT OF REMOTE SERVERS

[76] Inventor: Jim Nicolet, 209 E. Park Dr., Elk Ridge, Utah 84651

[21] Appl. No.: 607,599

[22] Filed: Feb. 27, 1996

Related U.S. Application Data

[63] Continuation of Ser. No. 355,369, Dec. 13, 1994, abandoned.

[51] Int. Cl.$^6$ ........................................ G06F 9/44
[52] U.S. Cl. .................. 395/684; 395/200.1; 395/653; 395/188.01
[58] Field of Search ................ 395/700, 188.01, 395/187.01, 186, 653, 200.1, 684; 380/23

[56] References Cited

U.S. PATENT DOCUMENTS

| | | | |
|---|---|---|---|
| 4,882,674 | 11/1989 | Quint et al. | 395/700 |
| 4,949,248 | 8/1990 | Caro | 395/200.09 |
| 5,218,697 | 6/1993 | Chung et al. | 395/200.18 |
| 5,257,369 | 10/1993 | Skeen et al. | 395/680 |
| 5,317,568 | 5/1994 | Bixby et al. | 370/401 |
| 5,321,841 | 6/1994 | East et al. | 395/677 |
| 5,329,619 | 7/1994 | Page et al. | 395/200.01 |
| 5,339,435 | 8/1994 | Lubkin et al. | 395/701 |
| 5,394,526 | 2/1995 | Crouse et al. | 395/200.01 |
| 5,421,009 | 5/1995 | Platt | 395/712 |
| 5,444,850 | 8/1995 | Chang | 395/200.1 |
| 5,452,454 | 9/1995 | Basu | 395/652 |
| 5,473,722 | 12/1995 | Halliwell et al. | 395/650 |
| 5,564,051 | 10/1996 | Halliwell et al. | 395/600 |

OTHER PUBLICATIONS

Technische Rundschau, vol. 81, No. 19, 12 May 1989, Bern CH, pp. 112–115, XP000110875 Franz–Joachim Kauffels: "Kommunikation im Rahmen von OS/2 (Teil II): Der LAN–Manager"—see p. 112, right–hand column, line 33—p. 114, middle column, line 35; figures 11–14.

Hewlett–Packard Journal, vol. 41, No. 2, Apr. 1990, Palo Alto, U.S., pp. 85–91, XP000116179 —Atul R. Garg and Lisa M. Cole: "Developing a Distributed Network Management Application Using HP OpenView Windows"—see p. 85, left–hand column, line 1 —p. 68, left–hand column, line 43; figures 1–5 —see p. 90, left–hand column, line 10, and right–hand column, line 19.

IBM Technical Disclosure Bulletin, vol. 30, No. 3, Aug. 1987, New York, U.S., p. 1407 XP002002812: "Method to Remotley Configure a Network Node from a Local Node"; whole document.

IBM Technical Disclosure Bulletin, vol. 36, No. 3, Mar. 1993, New York, U.S., pp. 421–425, XP000354831: "Remote Desktop Environments Reflected in Local Desktop Windows"; whole document.

IBM Technical Disclosure Bulletin, vol. 34, No. 9, Feb. 1992, New York, U.S., pp. 160–162, XP000300632: "Graphical User Interface for Managing Nodes in a Distributed System"; whole document.

Strom, David, Tracey Capen, "Novell NetWare 4 Version 4.01", Infoworld, v15, n46 p. 144(5), Nov. 15, 1993.

Johnstone, Adrian, "When worlds collide: Decnet meets Unix", Dec User, p. 33(3), Oct. 1989.

Fardal, Randy, "A designer's guide to bridging and routing", Networking Management, v10, n5, p.46(4), Apr. 1992.

Rago, Stephen A., "Unix System V Network Programming", Addison–Wesley, 1993 pp. 412–422.

Reiss, Levi and Joseph Radin, "Unix System Administration Guide", Osborne McGraw–Hill, 1993, pp. 96, 288, 289, 291, 292.

*Primary Examiner*—Kevin A. Kriess
*Assistant Examiner*—St. John Courtenay, III
*Attorney, Agent, or Firm*—Snell & Wilmer, L.L.P.

[57] ABSTRACT

A set of secure remote procedure calls are implemented in a network using the terms of the native communications protocol of the local and remote computers. The remote procedure calls allow a system administrator working from a client computer to directly interact and to manage the network operating system. One or more remote procedure calls are incorporated into the network client computer operating system and corresponding remote procedure calls are incorporated into the server computer operating system. As a result, developers may develop client software with the ability to load, unload or otherwise configure remote server applications using a network client computer to instruct the server computer operating system that supports the calls.

30 Claims, No Drawings

METHOD AND APPARATUS FOR PROVIDING SIMPLE SECURE MANAGEMENT OF REMOTE SERVERS

This is a continuation of application Ser. No. 08/355,369, filed Dec. 13, 1994, abandoned.

BACKGROUND

The present invention relates to the remote management of networked computers, and particularly to the remote management of network servers in a client-server computing environment.

Technological advances in microelectronics and digital computing systems have enabled the distribution of networking services across a wide range of computers participating in the network and over various communications media. Advances in distributing applications have also resulted in a client-server architecture for applications. Under the architecture, the portions of the application that interacts with the user are typically separated from the portions of the application that fulfill client process requests. Typically, the portions of an application that interact with the user are called a client or client software, whereas the portions of the application that services requests made by the client software are called a server or server software. However, a server could be running as a client to another server. In a network environment, the client and server are generally executed on different computers.

Management of the server software running on remote computers poses several problems. Historically, if the server software needed to be unloaded, configured or reloaded, the system administrator or other person responsible for administering network applications or the user of the client software was required to physically go to the remote computer and use the remote computer's input and display devices (usually, a keyboard and monitor) to reload, configure or unload the server software. If client software needed to have access to a server that was not loaded, the system administrator or user of the client software had to go physically to the remote computer and load the server software. If the client needed to interrogate the remote computer to determine what server software was available, or interrogate the remote computer to determine the devices supported by the remote computer, the system administrator or user had to physically go to the server and inspect the processes running on the server or physically inspect the devices attached to the remote computer.

Previously, the management of remote computers has typically been based on one of two schemes. One scheme, known as the remote console or log in scheme, employs client software that uses a simple network protocol, such as a protocol that provides for the creation, distribution and delivery of digital packets. The client software runs at the "Network" level of the Open Systems Interconnect or "OSI" model. Corresponding server software interacts directly with the client software. Through this scheme, the client software accepts input from the local computer, sends the input to the remote server software which in turn passes the keystrokes directly to the remote computer operating system. Given the nature of the scheme, that keystrokes entered on the local computer are passed over the network through the remote server software directly to the remote operating system, the only security that was employed was for access to the remote server application.

The second commonly used scheme uses the Simple Network Management Protocol ("SNMP"), and the Simple Management Protocol ("SMP"). Both are related and have the same historical roots. The scheme essentially defines two protocols for use in a heterogeneous environment. The major focus of the scheme does not concentrate on how remote computers are managed but on how to handle ensure the communication and interaction of heterogenous systems for management purposes. To date, the specification for this scheme consists of over 400 pages of documentation. Although this second scheme is useful in large heterogenous networks, the scheme fails to provide an elegant mechanism for client-server development of functionality to manage a specific remote network server over existing, native session level, i.e., at the "Session" level of the OSI model, network protocols.

Generally, all remote computers communicate in a network with other client computers by means of a network operating system that implements network communication by means of a native connection-based protocol running at the "transport" level of the OSI model ("native communications protocol"), such as Transmission Control Procedure ("TCP"), Server Message Block ("SMB"), or NetWare® Core Protocol ("NCP"). The developer of the network operating system provides a client that implements the native communications protocol on the local computer ("network client") and an operating system that implements the native communications protocol on the remote computer. Developers writing client-server software for such network operating systems presently may either employ a remote console system and rely on the user of the client software to know how to interact with the remote computer, or employ a heterogenous network management protocol and develop the associated client-server applications to manage not only the local computer but various remote heterogeneous computers as well. Neither is satisfactory.

The remote console approach requires the user to know too much and lacks robust security. The heterogenous protocol requires the developer to do too much. The developer must implement the protocol, write the client and server applications and have access to the system internals of one or more of the remote operating systems in order to implement the necessary functionality. Thus, network administrators have needed a simple means of implementing remote management of networked computers, particularly for remote management of network servers in a client-server computing environment.

SUMMARY OF THE INVENTION

According to the present invention, a set of secure remote procedure calls are implemented in the network using the terms of the native communications protocol of the local and remote computers. The remote procedure calls allow client software to directly interact with the operating system of the remote computer so as to avoid the inherent problems of the currently available schemes. One or more remote procedure calls are incorporated into the network client and corresponding remote procedure calls are incorporated into the server operating system. Developers who then wish to develop client software with the ability to load, unload or otherwise configure their remote server applications may do so using a network client and server operating system supporting the calls.

DETAILED DESCRIPTION OF THE INVENTION

As depicted in the drawings, the present invention is implemented in terms of several remote procedure calls.

Different remote procedure calls may be implemented to perform different tasks. Thus, a system administrator may easily perform the specified tasks from a remote location.

In one embodiment of the invention, remote procedure calls have been implemented for loading a remote process, unloading a remote process, mounting a remote volume, dismounting a remote volume, adding a name space to a volume, issuing set procedures to the remote operating system and executing a remote batch file. In the network client, code is implemented that creates packets conforming with the structure of the remote procedure calls in the server and in the form required by the underlying network communications protocol. For example, in a client-server environment supporting the NCP protocol, the client and server remote procedure calls must comply with the general NCP packet structure.

Each verb of the NCP protocol has a fixed packet header and a variable data block. Each verb has three fields and is known by a name and number. The name, such as "RPC Load an NLM" (which stands for "Remote Procedure Call to Load a NetWare® Loadable Module") by itself is useful only for describing the task that the verb performs. The numbers associated with the three fields for the RPC Load an NLM are 0x2222, 131 and 01. The verb number (all three fields) acts as a unique identifier for the verb. The initial field of the number identifies the service category. For example all service oriented NCPs use 0x2222. The fixed packet header contains the type of request and other parameters necessary for the client and server to continue to communicate about a request, such as transaction sequence number, service connection number and task number.

NCP Protocol Environment

Because an understanding of the underlying network communications protocol is imperative to implementing the invention, and given that the embodiment of the invention discussed herein implements the invention as a set of remote procedure calls in an NCP environment, a typical client-server request session for the invention is described, but the basic concept of this invention may also be used in other operating environments. The session tracks the sequence of events from when the client software first requests that the remote server operating system loads a remote process. Prior to making the request, the client must be connected and authenticated to the remote computer and the user making the request must have the appropriate level of security. (See Security below). The basic steps in one embodiment of the invention, called "RPC Load an NLM" in the NetWare® Core Protocol environment, for remotely loading a server process (called an NLM or NetWare® Loadable Module) are:

1. The client software needing the services of a remote server software process issues a request to network client that also must be running in the local computer. The request is intercepted in the NetWare® environment through a module in the local network client known as the NetWare® shell.
2. The NetWare® shell interprets the request as an NCP request and passes the request to another module of the network client capable of creating an NCP packet. The NCP packet creation module, namely NCP.VLM in the NetWare® environment, creates the RPC Load an NLM verb and places it on the underlying transport.
3. The RPC Load an NLM request is then sent in the form of an NCP packet. The structure for the RPC Load an NLM verb is as provided in Table 1.

TABLE 1

| Request Format Offset | Content | | Type |
|---|---|---|---|
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (see below) | WORD (Hi Lo format) |
| 9 | SubFuncCode | (01) | BYTE |
| 10 | NLMLoadOptions | (see below) | LONG |
| 14 | reserved | (0) | LONG[3] |
| 26 | reservedFlags | {0} | BYTE[4] |
| 30 | PathAndName | (see below) | BYTE[] |

Each NCP packet begins with a small message header that carries general status information about the current state of the connection between the client and the server. The client request header is seven bytes long, while a server's reply header is eight bytes long. As shown in Table 1, the RequestType variable defines the type of network request. A type of 0x1111 is reserved for connection allocation services; a type of 0x2222 is reserved for server request services; a type of 3333 is reserved for server responses; a type of 0x5555 is reserved for destroying connections; and a type of 0x9999 is reserved for work in progress responses.

The sequence number maintains a numeric counter for all incoming requests to provide reply prioritization. The ConnectionNumberLow and the ConnectionNumberHigh numbers identify a particular service connection between the client and the server. The TaskNumber distinguishes which client process or thread is making the request to the server.

In the NetWare® environment the SubFuncStrucLen will be 21 plus the size of the PathAndName (ASCII) including the terminating null. The NLMLoadOptions include options to load the server process in a processor ring such as ring 0, 1, 2 or 3. The PathAndName variable of the structure includes the path and file name in ASCII of the location of the server software to be executed in the format of {volume name: }{path\...}file name\0.

TABLE 2

| ReplyFormat Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG[4] |

The server operating system responds to the "RPC Load an NLM" verb through the reply format provided in Table 2. In addition to the general message header information contained in the packet, the response packet includes the Completion Code, which will be 0 if the request was completed successfully or 251 if the server received an invalid subfunction request, namely one not matching the "RPC Load an NLM" verb structure.

The RPCcode contains information about the request to load the server process. If the server process was successfully loaded and executed, the RPCcode will contain a 0. If the server software module to be loaded in response to the request was not found or the name was not provided with the request, the server will return an RPCcode value of 158.

Client Software Implementing the Invention

Developers may use the present invention to develop client software that interacts with the network client to issue the appropriate remote procedure calls, depending on the desired function of the client software. As a means of testing the client software aspect of the invention the following client software programs are provided. The programs exercise each of the remote procedure calls identified in the current embodiment.

RPC Load an NLM

```
#include <stdio.h>
#include <stdlib.h>
#include <string.h>
#include "nwcalls.h"
#include <time.h>

WORD connectionID = 0;
NW_FRAGMENT nwFrag[10] = {0};

typedef struct
{
        WORD sflen;
        BYTE sfcode;
        LONG parm0;
        LONG parm1;
        LONG parm2;
        LONG parm3;
        BYTE flag0;
        BYTE flag1;
```

```
            BYTE flag2;
            BYTE flag3;
      } rpcreq;

typedef struct
  5   {
            LONG rpcCompletionCode;
            LONG rpcFailureCode;
            LONG rpc2;
            LONG rpc3;
 10         LONG rpc4;
      } rpcrep;

rpcreq req;
      rpcrep rep;

void main (int argc, int *argl[])
 15   {
      WORD ccode;
            if (argc < 2)
            {
                  printf("\nUsage: LOAD {volumename:}{path\\}filename");
 20               exit(0);
            }
            ccode = NWGetDefaultConnectionID( &connectionID);
            if (ccode)
            {
 25               printf("\nNWGetDefaultConnectionID failed, err = 0x%0x",
      ccode);
                  exit(1);
            }
            /* convert to the name space path */
 30         nwFrag[0].fragAddress = &req;
            nwFrag[0].fragSize = sizeof(rpcreq);
            nwFrag[2].fragAddress = &rep;
            nwFrag[2].fragSize = sizeof(rpcrep);
            req.sflen = NWWordSwap(sizeof(rpcreq) + strlen((char *)argl[1]) +
 35   1);
            req.sfcode = 1;
```

```
            nwFrag[1].fragAddress = argl[1];
            nwFrag[1].fragSize = strlen((char *)argl[1]) + 1;
            ccode = NWRequest(connectionID, 131, 2, &nwFrag[0], 1,
        &nwFrag[2]);
 5          if (ccode)
            {
                printf("\nNWRequest rtn ccode = %u(0x%x)", ccode, ccode);
                exit(0);
            }
10          if (rep.rpcCompletionCode == 0)
            {
                printf("\nThe select file has been loaded.");
            }
            else
15          {
                printf("\nThe select file was unable to be loaded (%ld).",
                        rep.rpcCompletionCode);
            }
        }

20      RPC Unload an NLM include <stdio.h>
        #include <stdlib.h>
        #include <string.h>
        #include "nwcalls.h"
25      #include <time.h>

WORD connectionID = 0;
        NW_FRAGMENT nwFrag[10] = {0};

typedef struct
        {
30          WORD sflen;
            BYTE sfcode;
            LONG parm0;
            LONG parm1;
```

```
            LONG parm2;
            LONG parm3;
            BYTE flag0;
            BYTE flag1;
            BYTE flag2;
            BYTE flag3;
      } rpcreq;

typedef struct
      {
            LONG rpcCompletionCode;
            LONG rpcFailureCode;
            LONG rpc2;
            LONG rpc3;
            LONG rpc4;
      } rpcrep;

rpcreq req;
      rpcrep rep;

void main (int argc, int *argl[])
      {
      WORD ccode;
            if (argc < 2)
            {
                  printf("\nUsage: UNLOAD filename");
                  exit(0);
            }
            ccode = NWGetDefaultConnectionID( &connectionID);
            if (ccode)
            {
                  printf("\nNWGetDefaultConnectionID failed, err = 0x%0x",
      ccode);
                  exit(1);
            }
            /* convert to the name space path */
            nwFrag[0].fragAddress = &req;
            nwFrag[0].fragSize = sizeof(rpcreq);
            nwFrag[2].fragAddress = &rep;
```

11

```
        nwFrag[2].fragSize = sizeof(rpcrep);
        req.sflen = NWWordSwap(sizeof(rpcreq) + strlen((char *)argl[1]) +
1);
        req.sfcode = 2;
        nwFrag[1].fragAddress = argl[1];
        nwFrag[1].fragSize = strlen((char *)argl[1]) + 1;
        ccode = NWRequest(connectionID, 131, 2, &nwFrag[0], 1,
&nwFrag[2]);
        if (ccode)
        {
                printf("\nNWRequest rtn ccode = %u(0x%x)", ccode, ccode);
                exit(0);
        }
        if (rep.rpcCompletionCode == 0)
        {
                printf("\nThe select file has been unloaded.");
        }
        else
        {
                printf("\nThe select file was unable to be unloaded (%ld).",
                        rep.rpcCompletionCode);
        }
}
```

RPC Mount Volume

```
        #include <stdio.h>
        #include <stdlib.h>
        #include <string.h>
5       #include "nwcalls.h"
        #include <time.h>

WORD connectionID = 0;
        NW_FRAGMENT nwFrag[10] = {0};

typedef struct
10      {
                WORD sflen;
                BYTE sfcode;
                LONG parm0;
                LONG parm1;
15              LONG parm2;
                LONG parm3;
                BYTE flag0;
                BYTE flag1;
                BYTE flag2;
20              BYTE flag3;
        } rpcreq;

typedef struct
        {
                LONG rpcCompletionCode;
25              LONG rpcFailureCode;
                LONG rpc2;
                LONG rpc3;
                LONG rpc4;
                LONG mountedVolumeNumber;
30      } rpcrep;

rpcreq req;
        rpcrep rep;
```

13

```
void main (int argc, int *argl[])
{
WORD ccode;
    if (argc < 2)
    {
        printf("\nUsage: MOUNT volumename");
        exit(0);
    }
    ccode = NWGetDefaultConnectionID( &connectionID);
    if (ccode)
    {
        printf("\nNWGetDefaultConnectionID failed, err = 0x%0x", ccode);
        exit(1);
    }
    /* convert to the name space path */
    nwFrag[0].fragAddress = &req;
    nwFrag[0].fragSize = sizeof(rpcreq);
    nwFrag[2].fragAddress = &rep;
    nwFrag[2].fragSize = sizeof(rpcrep);
    req.sflen = NWWordSwap(sizeof(rpcreq) + strlen((char *)argl[1]) + 1);
    req.sfcode = 3;
    nwFrag[1].fragAddress = argl[1];
    nwFrag[1].fragSize = strlen((char *)argl[1]) + 1;
    ccode = NWRequest(connectionID, 131, 2, &nwFrag[0], 1, &nwFrag[2]);
    if (ccode)
    {
        printf("\nNWRequest rtn ccode = %u(0x%x)", ccode, ccode);
        exit(0);
    }
    if (rep.rpcCompletionCode == 0)
    {
        printf("\nThe select volume was mounted.");
    }
    else
    {
        printf("\nThe select volume was unable to be mounted
```

```
                             (%ld).",
                                        rep.rpcCompletionCode);
               }
         }
```

RPC Dismount Volume

```c
#include <stdio.h>
#include <stdlib.h>
#include <string.h>
#include "nwcalls.h"
#include <time.h>

WORD connectionID = 0;
NW_FRAGMENT nwFrag[10] = {0};

typedef struct
{
      WORD sflen;
      BYTE sfcode;
      LONG parm0;
      LONG parm1;
      LONG parm2;
      LONG parm3;
      BYTE flag0;
      BYTE flag1;
      BYTE flag2;
      BYTE flag3;
} rpcreq;

typedef struct
{
      LONG rpcCompletionCode;
      LONG rpcFailureCode;
      LONG rpc2;
      LONG rpc3;
      LONG rpc4;
```

```
     } rpcrep;

rpcreq req;
     rpcrep rep;

void main (int argc, int *argl[])
5    {
     WORD ccode;
          if (argc < 2)
          {
               printf("\nUsage: DISMOUNT volumename");
10             exit(0);
          }
          ccode = NWGetDefaultConnectionID( &connectionID);
          if (ccode)
          {
15             printf("\nNWGetDefaultConnectionID failed, err = 0x%0x",
     ccode);
               exit(1);
          }
          /* convert to the name space path */
20        nwFrag[0].fragAddress = &req;
          nwFrag[0].fragSize = sizeof(rpcreq);
          nwFrag[2].fragAddress = &rep;
          nwFrag[2].fragSize = sizeof(rpcrep);
          req.sflen = NWWordSwap(sizeof(rpcreq) + strlen((char *)argl[1]) +
25   1);
          req.sfcode = 4;
          nwFrag[1].fragAddress = argl[1];
          nwFrag[1].fragSize = strlen((char *)argl[1]) + 1;
          ccode = NWRequest(connectionID, 131, 2, &nwFrag[0], 1,
30   &nwFrag[2]);
          if (ccode)
          {
               printf("\nNWRequest rtn ccode = %u(0x%x)", ccode, ccode);
               exit(0);
35        }
          if (rep.rpcCompletionCode == 0)
          {
```

```
                    printf("\nThe select volume was dismounted.");
            }
            else
            {
                    printf("\nThe select volume was unable to be dismounted
        (%ld).",
                            rep.rpcCompletionCode);
            }
        }

RPC Set Set Command Value include <stdio.h>
        #include <stdlib.h>
        #include <string.h>
        #include "nwcalls.h"
        #include <time.h>

WORD connectionID = 0;
        NW_FRAGMENT nwFrag[10] = {0};

typedef struct
        {
                WORD sflen;
                BYTE sfcode;
                LONG parm0;
                LONG parm1;
                LONG parm2;
                LONG parm3;
                BYTE flag0;
                BYTE flag1;
                BYTE flag2;
                BYTE flag3;
        } rpcreq;

typedef struct
        {
```

17

```
                LONG rpcCompletionCode;
                LONG rpcFailureCode;
                LONG rpc2;
                LONG rpc3;
5               LONG rpc4;
        } rpcrep;

rpcreq req;
        rpcrep rep;

void main (int argc, int *argl[])
10      {
        WORD ccode, len, vlen;
        BYTE *bp;
                if (argc < 3)
                {
15                      printf("\nUsage: SETCMD <special> value");
                        exit(0);
                }
                ccode = NWGetDefaultConnectionID( &connectionID);
                if (ccode)
20              {
                        printf("\nNWGetDefaultConnectionID failed, err = 0x%0x",
        ccode);
                        exit(1);
                }
25              /* convert to the name space path */
                nwFrag[0].fragAddress = &req;
                nwFrag[0].fragSize = sizeof(rpcreq);
                nwFrag[5].fragAddress = &rep;
                nwFrag[5].fragSize = sizeof(rpcrep);
30              len = strlen((char *)argl[1]) + 1;
                vlen = strlen((char *)argl[2]) + 1;
                bp = (BYTE *) argl[1];
                while (*bp)
                {
35                      if (*bp == '_') *bp = 0x20;
                        bp++;
                }
```

18

```
        req.sflen = NWWordSwap(sizeof(rpcreq) + len + vlen);
        req.sfcode = 6;
        nwFrag[1].fragAddress = arg1[1];
        nwFrag[1].fragSize = len;
        nwFrag[2].fragAddress = arg1[2];
        nwFrag[2].fragSize = vlen;
        ccode = NWRequest(connectionID, 131, 3, &nwFrag[0], 1,
    &nwFrag[5]);
        if (ccode)
        {
            printf("\nNWRequest rtn ccode = %u(0x%x)", ccode, ccode);
            exit(0);
        }
        if (rep.rpcCompletionCode == 0)
        {
            printf("\nThe set command was changed.");
        }
        else
        {
            printf("\nThe set command was not set (%ld).",
                    rep.rpcCompletionCode);
        }
    }
```

RPC Execute NCF File

```
#include <stdio.h>
#include <stdlib.h>
#include <string.h>
#include "nwcalls.h"
#include <time.h>

WORD connectionID = 0;
NW_FRAGMENT nwFrag[10] = {0};

typedef struct
{
```

```
                WORD sflen;
                BYTE sfcode;
                LONG parm0;
                LONG parm1;
 5              LONG parm2;
                LONG parm3;
                BYTE flag0;
                BYTE flag1;
                BYTE flag2;
10              BYTE flag3;
        } rpcreq;

typedef struct
        {
                LONG rpcCompletionCode;
15              LONG rpcFailureCode;
                LONG rpc2;
                LONG rpc3;
                LONG rpc4;
        } rpcrep;

20      rpcreq req;
        rpcrep rep;

void main (int argc, int *argl[])
        {
        WORD ccode;
25              if (argc < 2)
                {
                        printf("\nUsage: NCF {volumename:}{path\\}filename");
                        exit(0);
                }
30              ccode = NWGetDefaultConnectionID( &connectionID);
                if (ccode)
                {
                        printf("\nNWGetDefaultConnectionID failed, err = 0x%0x",
        ccode);
35                      exit(1);
                }
```

```
        /* convert to the name space path */
        nwFrag[0].fragAddress = &req;
        nwFrag[0].fragSize = sizeof(rpcreq);
        nwFrag[2].fragAddress = &rep;
        nwFrag[2].fragSize = sizeof(rpcrep);
        req.sflen = NWWordSwap(sizeof(rpcreq) + strlen((char *)argl[1]) +
1);
        req.sfcode = 7;
        nwFrag[1].fragAddress = argl[1];
        nwFrag[1].fragSize = strlen((char *)argl[1]) + 1;
        ccode = NWRequest(connectionID, 131, 2, &nwFrag[0], 1,
&nwFrag[2]);
        if (ccode)
        {
            printf("\nNWRequest rtn ccode = %u(0x%x)", ccode, ccode);
            exit(0);
        }
        if (rep.rpcCompletionCode == 0)
        {
            printf("\nThe select NCF file has been executed.");
        }
        else
        {
            printf("\nThe select file was unable to be executed (%ld).",
                rep.rpcCompletionCode);
        }
    }
```

RPC Ad Name Space to Volume

```
#include <stdio.h>
#include <stdlib.h>
#include <string.h>
#include "nwcalls.h"
#include <time.h>

WORD connectionID = 0;
```

21

```
            NW_FRAGMENT nwFrag[10] = {0};

typedef struct
            {
                    WORD sflen;
 5                  BYTE sfcode;
                    LONG parm0;
                    LONG parm1;
                    LONG parm2;
                    LONG parm3;
10                  BYTE flag0;
                    BYTE flag1;
                    BYTE flag2;
                    BYTE flag3;
            } rpcreq;

15          typedef struct
            {
                    LONG rpcCompletionCode;
                    LONG rpcFailureCode;
                    LONG rpc2;
20                  LONG rpc3;
                    LONG rpc4;
            } rpcrep;

rpcreq req;
            rpcrep rep;

25          char spaceChar[] = " \0";

void main (int argc, int *argl[])
            {
            WORD ccode, len;
                    if (argc < 3)
30                  {
                            printf("\nUsage: ADDNS NameSpaceName volumename");
                            exit(0);
                    }
                    ccode = NWGetDefaultConnectionID( &connectionID);
```

```
            if (ccode)
            {
                    printf("\nNWGetDefaultConnectionID failed, err = 0x%0x",
     ccode);
                    exit(1);
            }
            /* convert to the name space path */
            nwFrag[0].fragAddress = &req;
            nwFrag[0].fragSize = sizeof(rpcreq);
            nwFrag[5].fragAddress = &rep;
            nwFrag[5].fragSize = sizeof(rpcrep);
            len = sizeof(rpcreq) + strlen((char *)argl[1]) + 2;
            len += (strlen((char *)argl[2]) + 1);
            req.sflen = NWWordSwap(len);
            req.sfcode = 5;
            req.parm0 = 0L;
            req.parm1 = 0L;
            nwFrag[1].fragAddress = argl[1];
            nwFrag[1].fragSize = strlen((char *)argl[1]);
            nwFrag[2].fragAddress = spaceChar;
            nwFrag[2].fragSize = 1;
            nwFrag[3].fragAddress = argl[2];
            nwFrag[3].fragSize = strlen((char *)argl[2]);
            nwFrag[4].fragAddress = &spaceChar[1];
            nwFrag[4].fragSize = 1;
            ccode = NWRequest(connectionID, 131, 5, &nwFrag[0], 1,
     &nwFrag[5]);
            if (ccode)
            {
                    printf("\nNWRequest rtn ccode = %u(0x%x)", ccode, ccode);
                    exit(0);
            }
            if (rep.rpcCompletionCode == 0)
            {
                    printf("\nThe select was added to the selected volume.");
            }
            else
            {
```

Remote Services

Although many remote services are possible, seven are implemented in the current embodiment, including "RPC Load an NLM," "RPC Unload an NLM," "RPC Mount a Volume," RPC Dismount a Volume,"RPC Add Name Space to Volume," "RPC Set Set Command Value," and "RPC Execute NCF File." "RPC Load and NLM" is discussed above. The remainder are discussed below.

RPC Unload an NLM

This aspect of the present invention handles client requests to unload a running process in the remote computer. The request/reply format for this remote procedure call is:

| Request Format Offset | Content | | Type |
|---|---|---|---|
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (see below) | WORD (Hi Lo format) |
| 9 | SubFuncCode | (02) | BYTE |
| 10 | reserved | (0) | LONG[4] |
| 26 | reservedFlags | {0} | BYTE[4] |
| 30 | PathAndName | (see below) | BYTE[] |

| ReplyFormat Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG |

| CompletionCode | |
|---|---|
| 0 | Successful |
| 251 | Invalid Subfunction Request |

| RPCccode | |
|---|---|
| 0 | Successful completion of the request RPC |
| 158 | Bad File Name or No File Name given |

SubFuncStrucLen

Sub function length will be 21 plus the size of the PathAndName (ASCIIZ) including the terminating null.

PathAndName

ASCII path and file name to load.

FORMAT: {volume name: }{path\...}file name\0

RPC Mount Volume

This aspect of the invention permits the client software to mount a remote storage volume. The request/reply format is as follows:

| Request Format Offset | Content | | Type |
|---|---|---|---|
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (see below) | WORD (Hi Lo format) |
| 9 | SubFuncCode | (03) | BYTE |
| 10 | reserved | (0) | LONG[4] |
| 26 | reservedFlags | {0} | BYTE[4] |
| 30 | VolumeName | (see below) | ASCIIZ |

| ReplyFormat Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG[4] |
| 28 | VolumeNumber | (variable) | LONG |

| CompletionCode | |
|---|---|
| 0 | Successful |
| 251 | Invalid Subfunction Request |

| RPCccode | |
|---|---|
| 0 | Successful completion of the request RPC Invalid Volume Name Voume Already Mounted |

SubFuncStrucLen

Sub function length will be 21 plus the size of the VolumeName (ASCIIZ) including the terminating null.

VolumeName

Volume Name (in ASCIIZ format) to be mounted.

FORMAT: volume name\0

RPC Dismount Volume

This aspect of the invention dismounts a volume on the remote computer. The request/reply format is as follows:

| Request Format Offset | Content | | Type |
|---|---|---|---|
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (21) | WORD (Hi Lo format) |
| 9 | SubFuncCode | (04) | BYTE |
| 10 | reserved | (0) | LONG[4] |

-continued

| Request Format Offset | Content | | Type |
|---|---|---|---|
| 26 | reservedFlags | {0} | BYTE[4] |
| 30 | VolumeName | (see below) | ASCIIZ |

| ReplyFormat Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG |

| CompletionCode | |
|---|---|
| 0 | Successful |
| 251 | Invalid Subfunction Request |

| RPCccode | |
|---|---|
| 0 | Successful completion of the request RPC |
| | Invalid Volume Name |

VolumeName

Volume Name (in ASCIIZ format) to be dismounted.

FORMAT: volume name\0

RPC Add Name Space To Volume

This aspect of the present invention permits a user to dynamically add a specified name space to a mounted volume on the remote computer. A name space supports specific attributes for a particular client, such as file name length, file characters, case sensitivity, multiple fries (such as a resource file containing formating information), vector graphics, and other such functions. The request/reply format in the NetWare® Core Protocol is:

| Request Format Offset | Content | | Type |
|---|---|---|---|
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (05) | WORD (Hi Lo format) |
| 9 | SubFuncCode | (04) | BYTE |
| 10 | reserved | (0) | LONG[4] |
| 26 | reservedFlags | {0} | BYTE[4] |
| 30 | AddNameSpace | (see below) | ASCIIZ |

| ReplyFormat Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG[4] |

| CompletionCode | |
|---|---|
| 0 | Successful |
| 251 | Invalid Subfunction Request |

| RPCccode | |
|---|---|
| 0 | Successful completion of the request RPC |

SubFuncStrucLen

Sub function length will be 21 plus the size of the AddNameSpace string (ASCIIZ) including the terminating null.

Add Name Space

AddNameSpace string (in ASCIIZ form) to add the name space to a selected volume name.

FORMAT: "NameSpaceName {TO} {VOLUME} VolumeName\0"

| NameSpaceName Format: | |
|---|---|
| Short Name | Long Name |
| MAC | MACINTOSH |
| UNIX | UNIX |
| FTAM | FTAM |
| OS2 | OS2 |
| NF | |

RPC Set Set Command Value

This aspect of the present invention allows the client to change the current value of a set command on the remote computer. In the NetWare® environment, the set command determines such things as communications parameters, memory allocations, file caching, directory caching, file system parameters, file locking parameters, transaction tracking, and disk management. The request/reply format is:

| Request Format | | | |
|---|---|---|---|
| Offset | Content | | Type |
| 0 | RequestType | (0x2222) | WORD |
| 2 | SequenceNumber | (LastSeq+1) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (06) | WORD (Hi Lo format) |
| 9 | SubFuncCode | (04) | BYTE |
| 10 | typeFlag | (see below) | LONG |

Request Format

| Offset | Content | | Type |
|---|---|---|---|
| 14 | Value | (see below) | LONG |
| 18 | reserved | (0) | LONG[2] |
| 26 | reservedFlags | {0} | BYTE[4] |
| 30 | SetCmdName | (see below) | ASCIIZ |
| xx | {optional string} | (see typeFlag) | ASCIIZ |

ReplyFormat

| Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG[4] |

Completion Code

| | |
|---|---|
| 0 | Successful |
| 251 | Invalid Subfunction Request |

RPCccode

0 Successful completion of the request RPC

SubFuncStrucLen

Sub function length will be 21 plus the size of the SetCmdName including the terminating null. If typeFlag is zero, then the optional string size including the null will must be included in the Sub Func Struc Len field.

typeFlag

If zero, then the optional string, which follows the SetCmdName, is the new value of the set command. If one, the the Value field contains the new value of the set command.

Value

New value of the set command parameter (if typeFlag is equal to one).

Set Cmd Name

Set parameter command name in ASCIIZ format.

{optional string}

If typeFlag is zero, this string used for the new set command parameter value. The set command parameter types (SP_TYPE_STRING & SP_TYPE_TIME_OFFSET) require a string instead of a numerical value.

RPC Execute NCF File

This aspect of the present invention allows the execution of a selected batch file on the remote computer. Thus the client software can copy a batch file to the server and then request the server to execute the batch file. The batch fie must comply with the underlying server operating system requirements. In the present embodiment as implemented in the NetWare® Core Protocol environment, the request/reply format is:

Request Format

| Offset | Content | | Type |
|---|---|---|---|
| 0 | RequestType | (0x2222) | WORD |
| 2 | SequenceNumber | (LastSeq+1) | BYTE |
| 3 | ConnectionHigh | (Serviceconn) | BYTE |
| 4 | TaskNumber | (CurrentTaskNum) | BYTE |
| 5 | ConnectionLow | (ServiceConn) | BYTE |
| 6 | FunctionCode | (131) | BYTE |
| 7 | SubFuncStrucLen | (see below) | WORD (Hi Lo format) |
| 9 | SubFuncCode | (07) | BYTE |
| 10 | reserved | (0) | LONG[4] |
| 26 | reservedFlags | {0} | BYTE[4] |
| 30 | PathAndName | (see below) | BYTE[ ] |

ReplyFormat

| Offset | Content | | Type |
|---|---|---|---|
| 0 | ReplyType | (0x3333) | WORD |
| 2 | SequenceNumber | (ReqSeqNum) | BYTE |
| 3 | ConnectionHigh | (ServiceConn) | BYTE |
| 4 | TaskNumber | (CurrentTaskNum) | BYTE |
| 5 | ConnectionLow | (ServiceConn) | BYTE |
| 6 | CompletionCode | (variable) | BYTE |
| 7 | ConnStatusFlags | (variable) | BYTE |
| 8 | RPCccode | (see below) | LONG |
| 12 | reserved | (0) | LONG[4] |

CompletionCode

| | |
|---|---|
| 0 | Successful |
| 251 | Invalid Subfunction Request |

RPCccode

| | |
|---|---|
| 0 | Successful completion of the request RPC |
| 158 | Bad File Name or No File Name given |

SubFuncStrucLen

Sub function length will be 2 1 plus the size of the PathAndName (ASCIIZ) including the terminating null.

PathAndName

ASCIIZ path and file name to execute.

FORMAT: {volume name: }{path\...}file name\0

Security

One aspect of the present invention is the reliance on the security inherent in the network communication protocol. In the NetWare® environment, the security in the NCP protocol is provided through digital packet signing. The method and apparatus used in the NCP network communications protocol is described in greater detail in U.S. Pat. No. 5,349,642 issued Sep. 20, 1994, the disclosure of which is incorporated herein by this reference.

Server Implementation

The implementation of the remote procedure calls within the server maps the calls to the appropriate server operating system functions. In this fashion, the server implementation avoids the remote console login approach where each keystroke from the client is captured, packaged and sent to the server and then entered through the system console. In one embodiment, this aspect of the present invention is implemented in the NetWare® server environment as follows:

```
void Case131(
            struct RequestPacketStructure *Request,
            struct ReplyProceduresStructure *RP,
            LONG reserved, LONG PacketSize)
{
LONG ccode, subFunctionLen, rcode, scode, len, cmdLen, station, flags;
LONG originalSystemConsoleOwner, AnswerLength;
struct ConnectionStructure *connection;
BYTE Answer[536];

if (reserved == 0) ;

subFunctionLen = (LONG) InvertShort(((ncp123 *)Request)->SubFuncLen);
        rcode = Request->RData[2];
        station = Request->RConnectionNumber;

if (NCPBoundaryCheck(PacketSize, subFunctionLen + ncpPkHdSize))
        {
                NCPBoundCheckFailed++;
                if (NCPBoundCheckFlag)
                {
                        if (NCPBoundWarningFlag)
                        {
                                StationAttemptedToUseBadPacket.nwTargetStation = station;
                                NetWareAlert( OSHandle,
                                        &StationAttemptedToUseBadPacket, 3,
                                                station, 131, rcode);
                        }
                        (*RP->ReplyKeepNoFragments)(Request,
                                ERR_NCP_BOUNDARY_CHECK_FAILED);
                        return;
                }
                if (NCPBoundWarningFlag)
                        NetWareAlert( OSHandle, &StationUsedBadPacket, 3,
                                        station, 131, rcode);
        }
```

38

```
        /* make sure they are authenticated and are supervisor or better */
        ccode = GetConnectionAuthenticationState(station);
        scode = IsSupervisor(station);
        if ((ccode != PERMANENT_AUTHENTICATED) || (!scode))
        {
                connection = (*connectionTable)[station];
                NetWareAlert( OSHandle, &StaWithoutRightsConsoleRPC,
                        1, station, connection->objectName);
                (*RP->ReplyKeepNoFragments)(Request,
ERR_CONNECTION_NOT_AUTHENTICATED);
                return;
        }
        connection = (*connectionTable)[station];

/* check access from Allow Remote Command Line Processing =
                0 - Always,  1 - Yes if Console not Secure,  2 - Never
                Default is 1 */ if (AllowRemoteCmdLineProcessing == 2)
        {
                NetWareAlert( OSHandle, &StaWithoutRightsConsoleRPC,
                        1, station, connection->objectName);
                (*RP->ReplyKeepNoFragments)(Request, ERR_IO_LOCKED);
                return;
        } if (AllowRemoteCmdLineProcessing == 1)
        {
                if (consoleSecured == TRUE)
                {
                        NetWareAlert( OSHandle, &StaWithoutRightsConsoleRPC,
                                1, station, connection->objectName);
                        (*RP->ReplyKeepNoFragments)(Request, ERR_IO_LOCKED);
                        return;
                }
        }

/* Now become the owner of the systemConsoleScreen */
        originalSystemConsoleOwner =
RemoveScreenKeyboardOwner(systemConsoleScreen);
        if (!originalSystemConsoleOwner)
        {
                /* wait for a second */
                DelayMyself(18, OSTimerResourceTag);
```

```
                originalSystemConsoleOwner =
RemoveScreenKeyboardOwner(systemConsoleScreen);
                if (!originalSystemConsoleOwner)
                {
                        (*RP->ReplyKeepNoFragments)(Request, ERR_ACCESS_DENIED);
                        return;
                }
        }

/* RPC errors codes are always returned in the reply packet */
        ccode = 0;
        AnswerLength = 5*4; /* always room for the ccode + reserved fields */
        CSetD(0, &Answer, 5*4);
        cmdLen = CStrLen((BYTE *)&((ncp131 *)Request)->rpcCmdLine); /* don't count
null yet */
        switch (rcode)
        {
                case 7: /* RPC Execute NCF File */
                        if (NCPSubFunctionCheck(subFunctionLen, 21 + cmdLen + 1))
                        {
                                NCPCompCheckFailed++;
                                if (NCPCompCheckFlag)
                                {
                                        if (NCPCompWarningFlag)
                                        {

NCPHasBadSubFunctionLength.nwTargetStation = station;
                                                NetWareAlert( OSHandle,
&NCPHasBadSubFunctionLength, 3,
                                                        station,131, rcode);
                                        }
                                        OutputToScreen(systemConsoleScreen,"\n%s",
consolePrompt);

SetInputToOutputCursorPosition(systemConsoleScreen);
                                        RestoreScreenKeyboardOwner(systemConsoleScreen,
                                                originalSystemConsoleOwner);
                                        (*RP->ReplyKeepNoFragments)(Request,
ERR_NCP_BOUNDARY_CHECK_FAILED);
                                        return;
                                }
                                if (NCPCompWarningFlag)
                                        NetWareAlert( OSHandle,
&NCPUsedBadSubFunctionLength, 3,
```

```
                                            station, 131, rcode);
                        }
                        if (((ncp131 *)Request)->rpcCmdLine == NULL)
                        {
                                ccode = ERR_BAD_FILE_NAME;
                                break;
                        }
                        ConvertToUpperCase((BYTE *)&((ncp131 *)Request)->rpcCmdLine);
                        ccode = ExecuteCommandFile((BYTE *)&((ncp131
*)Request)->rpcCmdLine);
                        if (ccode)
                        {
                                *((LONG *)&Answer[4]) = ccode; /* return the reason */

}
                        break;

ccode = ERR_INVALID_NAME_SPACE;
                        switch (((ncp131 *)Request)->rpcParms[0])
                        {
                                case 1:
                                        rcode = (LONG) &((ncp131
*)Request)->rpcParms[1];
                                        len = 0;
                                        ccode = 0;

case 0:
                                        rcode = ((LONG) &((ncp131
*)Request)->rpcCmdLine) + cmdLen + 1; /* skip null */
                                        len = CStrLen((BYTE *) rcode) + 1; /* count
null */
                                        ccode = 0;
                                        break;
                                default:
                                        ccode = ERR_NO_SET_PRIVILEGE;
                                        break;
                        }
                        if ((ccode) || (((ncp131 *)Request)->rpcCmdLine == NULL))
break;
                        if (NCPSubFunctionCheck(subFunctionLen, 21 + cmdLen + 1 +
len))
                        {
                                NCPCompCheckFailed++;
                                if (NCPCompCheckFlag)
```

41

```
                                {
                                    if (NCPCompWarningFlag)
                                    {
        NCPHasBadSubFunctionLength.nwTargetStation = station;
                                            NetWareAlert( OSHandle,
        &NCPHasBadSubFunctionLength, 3,
                                                station,131, rcode);
                                    }
                                    OutputToScreen(systemConsoleScreen,"\n%s",
        consolePrompt);

SetInputToOutputCursorPosition(systemConsoleScreen);
                                        RestoreScreenKeyboardOwner(systemConsoleScreen,
                                            originalSystemConsoleOwner);
                                    (*RP->ReplyKeepNoFragments)(Request,
        ERR_NCP_BOUNDARY_CHECK_FAILED);
                                    return;
                                }
                                if (NCPCompWarningFlag)
                                    NetWareAlert( OSHandle,
        &NCPUsedBadSubFunctionLength, 3,
                                        station, 131, rcode);
                            }
                            /* make sure this is setable */
                            ccode = ScanSetableParameters(-2, &scode, NULL, &flags, NULL, NULL, NULL, NULL,
        NULL);
                            if (!ccode)
                            {
                                if (flags & SP_RPC_LOCKOUT)
                                {
                                    ccode = ERR_HARD_IO_ERROR;
                                }
                                else
                                {
                                    ccode = SetSetableParameterValue(station, (void *)rcode); /* pointer to the new
        value */
                                }
                            }
                            if (ccode)
```

42

```
                            {
                                    *((LONG *)&Answer[4]) = ccode; /* return the reason */
                                    ccode = ERR_UNABLE_TO_SET_PARAMETER_VALUE;
                            }
 5                          break;

/* For now do sub func. check here */
                            if (NCPSubFunctionCheck(subFunctionLen, 21 + cmdLen + 1))
                            {
10                                  NCPCompCheckFailed++;
                                    if (NCPCompCheckFlag)
                                    {
                                            if (NCPCompWarningFlag)
                                            {
15          NCPHasBadSubFunctionLength.nwTargetStation = station;
                                                    NetWareAlert( OSHandle,
            &NCPHasBadSubFunctionLength, 3,
                                                            station,131, rcode);
20                                              }
                                                OutputToScreen(systemConsoleScreen,"\n%s",
            consolePrompt);

SetInputToOutputCursorPosition(systemConsoleScreen);
25                                              RestoreScreenKeyboardOwner(systemConsoleScreen,
                                                        originalSystemConsoleOwner);
                                                (*RP->ReplyKeepNoFragments)(Request,
            ERR_NCP_BOUNDARY_CHECK_FAILED);
                                                return;
30                                      }
                                        if (NCPCompWarningFlag)
                                                NetWareAlert( OSHandle,
            &NCPUsedBadSubFunctionLength, 3,
                                                        station, 131, rcode);
35                          }
                            if (((ncp131 *)Request)->rpcCmdLine == NULL)
                            {
                                    ccode = ERR_INVALID_NAME_SPACE;
                                    break;
40                          }
                            ConvertToUpperCase((BYTE *)&((ncp131 *)Request)->rpcCmdLine);
                            ccode = AddNameSpaceToVolume(systemConsoleScreen,
                                            &((ncp131 *)Request)->rpcCmdLine,
                                            ((ncp131 *)Request)->rpcParms[0],
```

```
                                            ((ncp131 *)Request)->rpcParms[1]);
                        if (ccode)
                        {
                                *((LONG *)&Answer[4]) = ccode; /* return the reason */
                                ccode = ERR_UNABLE_TO_ADD_NAME_SPACE;
                        }
                        break;

if (NCPSubFunctionCheck(subFunctionLen, 21 + cmdLen + 1))
                        {
                                NCPCompCheckFailed++;
                                if (NCPCompCheckFlag)
                                {
                                        if (NCPCompWarningFlag)
                                        {
NCPHasBadSubFunctionLength.nwTargetStation = station;
                                                NetWareAlert( OSHandle,
&NCPHasBadSubFunctionLength, 3,
                                                        station,131, rcode);
                                        }
                                        OutputToScreen(systemConsoleScreen,"\n%s",
consolePrompt);

SetInputToOutputCursorPosition(systemConsoleScreen);
                                        RestoreScreenKeyboardOwner(systemConsoleScreen,
                                                originalSystemConsoleOwner);
                                        (*RP->ReplyKeepNoFragments)(Request,
ERR_NCP_BOUNDARY_CHECK_FAILED);
                                        return;
                                }
                                if (NCPCompWarningFlag)
                                        NetWareAlert( OSHandle,
&NCPUsedBadSubFunctionLength, 3,
                                                station, 131, rcode);
                        }
                        ConvertToUpperCase((BYTE *)&((ncp131 *)Request)->rpcCmdLine);
                        ccode = ProcessDismountVolume(&((ncp131
*)Request)->rpcCmdLine, TRUE);
                        if (ccode)
                        {
                                *((LONG *)&Answer[4]) = ccode; /* return the reason */
                                ccode = ERR_UNABLE_TO_DISMOUNT_VOLUME;
                        }
```

44

```
                            break;

if (NCPSubFunctionCheck(subFunctionLen, 21 + cmdLen + 1))
                    {
                            NCPCompCheckFailed++;
                            if (NCPCompCheckFlag)
                            {
                                    if (NCPCompWarningFlag)
                                    {
NCPHasBadSubFunctionLength.nwTargetStation = station;
                                            NetWareAlert( OSHandle,
    &NCPHasBadSubFunctionLength, 3,
                                                    station,131, rcode);
                                    }
                                    OutputToScreen(systemConsoleScreen,"\n%s",
    consolePrompt);

SetInputToOutputCursorPosition(systemConsoleScreen);
                                    RestoreScreenKeyboardOwner(systemConsoleScreen,
                                            originalSystemConsoleOwner);
                                    (*RP->ReplyKeepNoFragments)(Request,
    ERR_NCP_BOUNDARY_CHECK_FAILED);
                                    return;
                            }
                            if (NCPCompWarningFlag)
                                    NetWareAlert( OSHandle,
    &NCPUsedBadSubFunctionLength, 3,
                                            station, 131, rcode);
                    }
                    if (((ncp131 *)Request)->rpcCmdLine == NULL)
                    {
                            ccode = ERR_INVALID_VOLUME;
                            break;
                    }
                    ConvertToUpperCase((BYTE *)&((ncp131 *)Request)->rpcCmdLine);
                    ccode = MountVolume(&((ncp131 *)Request)->rpcCmdLine, NULL,
                                    (LONG *)&Answer[5*4]);
                    if (ccode)
                    {
                            *((LONG *)&Answer[4]) = ccode; /* return the reason */
                            ccode = ERR_UNABLE_TO_MOUNT_VOLUME;
                    }
                    else
```

45

```
                        {
                                AnswerLength += 4;
                        }
                        break;

if (NCPSubFunctionCheck(subFunctionLen, 21 + cmdLen + 1))
                {
                        NCPCompCheckFailed++;
                        if (NCPCompCheckFlag)
                        {
                                if (NCPCompWarningFlag)
                                {

NCPHasBadSubFunctionLength.nwTargetStation = station;
                                        NetWareAlert( OSHandle,
&NCPHasBadSubFunctionLength, 3,
                                                station,131, rcode);
                                }
                                OutputToScreen(systemConsoleScreen,"\n%s",
consolePrompt);

SetInputToOutputCursorPosition(systemConsoleScreen);
                                RestoreScreenKeyboardOwner(systemConsoleScreen,
                                        originalSystemConsoleOwner);
                                (*RP->ReplyKeepNoFragments)(Request,
ERR_NCP_BOUNDARY_CHECK_FAILED);
                                return;
                        }
                        if (NCPCompWarningFlag)
                                NetWareAlert( OSHandle,
&NCPUsedBadSubFunctionLength, 3,
                                        station, 131, rcode);
                }
                if (((ncp131 *)Request)->rpcCmdLine == NULL)
                {
                        ccode = ERR_BAD_FILE_NAME;
                        break;
                }
                ConvertToUpperCase((BYTE *)&((ncp131 *)Request)->rpcCmdLine);
                ccode = UnloadModule(NULL, &((ncp131 *)Request)->rpcCmdLine);
                if (ccode)
                {
                        *((LONG *)&Answer[4]) = ccode; /* return the reason */
```

```
                              } break;

if (NCPSubFunctionCheck(subFunctionLen, 21 + cmdLen + 1))
                              {
                                      NCPCompCheckFailed++;
                                      if (NCPCompCheckFlag)
                                      {
                                              if (NCPCompWarningFlag)
                                              {
NCPHasBadSubFunctionLength.nwTargetStation = station;
                                                      NetWareAlert( OSHandle,
&NCPHasBadSubFunctionLength, 3,
                                                              station,131, rcode);
                                              }
                                              OutputToScreen(systemConsoleScreen,"\n%s",
consolePrompt);

SetInputToOutputCursorPosition(systemConsoleScreen);
                                              RestoreScreenKeyboardOwner(systemConsoleScreen,
                                                      originalSystemConsoleOwner);
                                              (*RP->ReplyKeepNoFragments)(Request,
ERR_NCP_BOUNDARY_CHECK_FAILED);
                                              return;
                                      }
                                      if (NCPCompWarningFlag)
                                              NetWareAlert( OSHandle,
&NCPUsedBadSubFunctionLength, 3,
                                                      station, 131, rcode);
                              }
                              if (((ncp131 *)Request)->rpcCmdLine == NULL)
                              {
                                      ccode = ERR_BAD_FILE_NAME;
                                      break;
                              }
                              ConvertToUpperCase((BYTE *)&((ncp131 *)Request)->rpcCmdLine);
                              rcode = ((ncp131 *)Request)->rpcParms[0] &
LOAD_OPTIONS_VALID_BIT_MASK;
                              rcode |= LOAD_REQUIRED_FLAGS;
                              ccode = LoadModule(systemConsoleScreen,
                                              &((ncp131 *)Request)->rpcCmdLine,
                                              rcode);
```

47

```
                if (ccode)
                {
                        *((LONG *)&Answer[4]) = ccode; /* return the reason */
                }
                break;

default:
                RestoreScreenKeyboardOwner(systemConsoleScreen,
                        originalSystemConsoleOwner);
                SetInputToOutputCursorPosition(systemConsoleScreen);
                ErrCase(Request, RP);
                return;
        }
        /* put back the owner of the screen */
        OutputToScreen(systemConsoleScreen,"\n%s", consolePrompt);
        SetInputToOutputCursorPosition(systemConsoleScreen);
        RestoreScreenKeyboardOwner(systemConsoleScreen,
                originalSystemConsoleOwner);
        /* return RPC errors in the repy packet */
        *((LONG *)&Answer) = ccode;
        if (AnswerLength > 100)
        {
                (*RP->ReplyDisgard)(Request, 0, 1, Answer, AnswerLength);
        }
        else
        {
                (*RP->ReplyKeep)(Request, 0, 1, Answer, AnswerLength);
        }
}
```

As a result of implementing this procedure, developers who wish to develop client software with the ability to load, unload or otherwise configure their remote server applications may do so using a network client and server operating system supporting the calls.

Although one embodiment of the invention has been illustrated and described, various modifications and changes may be made by those skilled in the art without departing from the spirit and scope of the invention.

I claim:

1. A method in a computer network that includes (a) a network client computer configured to request and receive network services through the use of digital message packets, the client computer comprising a first processor for executing computer programs, and user input and output hardware, said client computer being characterized by a unique user access password having a first level of security associated therewith; (b) a network server computer configured to request and receive network services through the use of digital message packets, the server computer comprising a processor for executing computer programs, a hard drive for storing a plurality of software modules, and a RAM, said server computer being characterized by an administrator access password having a second level of security associated therewith, which second level of security is greater than said first level of security; and (c) a server operating system, including a native communications protocol, resident in said server computer; the method of remotely reconfiguring said server operating system from said client computer comprising the steps of:

entering said user access password into said user input hardware to thereby establish a user session at said client computer;

transmitting a server process from said client computer to said server computer;

storing said server process at a first address on said hard drive of said server computer;

transmitting from said server computer to said client computer indicia of said first address;

constructing, by said client computer, a first digital message packet comprising a first field indicative of a request to load a software module, and a second field indicative of said first address;

transmitting said first packet from said client computer to said server computer;

processing said first and second fields by said server operating system;

retrieving said server process from said first address on said hard drive;

loading said server process into said RAM to thereby dynamically reconfigure said server operating system without using said administrator access password; and constructing a response message, by said server computer, and transmitting said response message to said client computer after said loading step, said response message indicating that said server process is loaded into said RAM, wherein said constructing step comprises building a message packet including an IPX header together with said first and second fields.

2. The method of claim 1, further comprising the step of loading a client application onto said client computer.

3. The method of claim 2, further comprising the step of running said client application on said client computer interactively with said server process.

4. The method of claim 3, further comprising the step of:

transmitting data packets between said client computer and said server computer using said reconfigured server operating system.

5. The method of claim 1, wherein said server process comprises a network operating system module.

6. The method of claim 1, wherein said first field comprises indicia of a predetermined remote procedure call.

7. The method of claim 6, wherein said remote procedure call comprises one of:

RPC load an NLM;

RPC unload an NLM;

RPC mount a volume;

RPC dismount a volume;

RPC add name space to volume;

RPC set command value; and

RPC execute NCF file.

8. The method of claim 1, wherein said second field comprises indicia of a logical address.

9. The method of claim 1, wherein said second field comprises indicia of a filename.

10. The method of claim 1, further comprising the steps of:

loading a client application onto said client computer and running said application; and accessing, by said application program, said server process during operation of said application program.

11. A method in a computer network that includes (a) a network client computer configured to request and receive network services through the use of digital message packets, the client computer comprising a first processor for executing computer programs, and user input and output hardware, said client computer being characterized by a unique user access password having a first level of security associated therewith; (b) a network server computer configured to request and receive network services through the use of digital message packets, the server computer comprising a processor for executing computer programs, a hard drive for storing a plurality of software modules, and a RAM, said server computer being characterized by an administrator access password having a second level of security associated therewith, which second level of security is greater than said first level of security; and (c) a server operating system, including a native communications protocol, resident in said server computer; the method of remotely reconfiguring said server operating system from said client computer comprising the steps of:

entering said user access password into said user input hardware to thereby establish a user session at said client computer;

transmitting a server process from said client computer to said server computer;

storing said server process at a first address on said hard drive of said server computer;

transmitting from said server computer to said client computer indicia of said first address;

constructing, by said client computer, a first digital message packet comprising a first field indicative of a request to load a software module, and a second field indicative of said first address;

transmitting said first packet from said client computer to said server computer;

processing said first and second fields by said server operating system;

retrieving said server process from said first address on said hard drive;

loading said server process into said RAM to thereby dynamically reconfigure said server operating system without using said administrator access password; and constructing a response message, by said server computer, and transmitting said response message to said client computer after said loading step, said response message indicating that said server process is loaded into said RAM, wherein said constructing step comprises the steps of:

retrieving a partially constructed digital message packet from a look-up table in said client computer; and manipulating said first and second fields in accordance with user requests received from said input hardware.

12. The method of claim 11, further comprising the step of loading a client application onto said client computer.

13. The method of claim 12, further comprising the step of running said client application on said client computer interactively with said server process.

14. The method of claim 13, further comprising the step of:

transmitting data packets between said client computer and said server computer using said reconfigured server operating system.

15. The method of claim 11, wherein said server process comprises a network operating system module.

16. The method of claim 11, wherein said first field comprises indicia of a predetermined remote procedure call.

17. The method of claim 16, wherein said remote procedure call comprises one of:

RPC load an NLM;

RPC unload an NLM;

RPC mount a volume;

RPC dismount a volume;

RPC add name space to volume;

RPC set command value; and

RPC execute NCF file.

18. The method of claim 11, wherein said second field comprises indicia of a logical address.

19. The method of claim 11, wherein said second field comprises indicia of a filename.

20. The method of claim 11, further comprising the steps of:

loading a client application onto said client computer and running said application; and accessing, by said application program, said server process during operation of said application program.

21. A method in a computer network that includes (a) a network client computer configured to request and receive network services through the use of digital message packets, the clients computer comprising a first processor for executing computer programs, and user input and output hardware, said client computer being characterized by a unique user access password having a first level of security associated therewith; (b) a network server computer configured to request and receive network services through the use of digital message packets, the server computer comprising a processor for executing computer programs, a hard drive for storing a plurality of software modules, and a RAM, said server computer being characterized by an administrator access password having a second level of security associated therewith, which second level of security is greater than said first level of security; and (c) a server operating system, including a native communications protocol, resident in said server computer; the method of remotely reconfiguring said server operating system from said client computer comprising the steps of:

entering said user access password into said user input hardware to thereby establish a user session at said client computer;

transmitting a server process from said client computer to said server computer;

storing said server process at a first address on said hard drive of said server computer;

transmitting from said server computer to said client computer indicia of said first address;

constructing, by said client computer, a first digital message packet comprising a first field indicative of a request to load a software module, and a second field indicative of said first address;

transmitting said first packet from said client computer to said server computer;

processing said first and second fields by said server operating system;

retrieving said server process from said first address on said hard drive;

loading said server process into said RAM to thereby dynamically reconfigure said server operating system without using said administrator access password; and constructing a response message, by said server computer, and transmitting said response message to said client computer after said loading step, said response message indicating that said server process is leaded into said RAM, wherein said constructing step further comprises adding a plurality of navigational fields to said first digital message packet in addition to said first and second fields, and wherein said processing step comprises stripping off said plurality of fields such that said server operating system process only said first and second fields.

22. The method of claim 21, further comprising the step of loading a client application onto said client computer.

23. The method of claim 22, further comprising the step of running said client application on said client computer interactively with said server process.

24. The method of claim 23, further comprising the step of:

transmitting data packets between said client computer and said server computer using said reconfigured server operating system.

25. The method of claim 21, wherein said server process comprises a network operating system module.

26. The method of claim 21, wherein said first field comprises indicia of a predetermined remote procedure call.

27. The method of claim 26, wherein said remote procedure call comprises one of:

RPC load an NLM;

RPC unload an NLM;

RPC mount a volume;

RPC dismount a volume;

RPC add name space to volume;

RPC set command value; and

RPC execute NCF file.

28. The method of claim 21, wherein said second field comprises indicia of a logical address.

29. The method of claim 21, wherein said second field comprises indicia of a filename.

30. The method of claim 21, further comprising the steps of:

loading a client application onto said client computer and running said application; and accessing, by said application program, said server process during operation of said application program.

* * * * *